United States Patent [19]

Vieil et al.

[11] Patent Number: 5,480,924
[45] Date of Patent: Jan. 2, 1996

[54] CONDUCTIVE POLYMER DOPED BY A SULPHONATED CYCLODEXTRIN SALT AND DEVICE FOR OBTAINING AND/OR SUPPLYING AN ACTIVE SUBSTANCE INCORPORATING SAID POLYMER

[75] Inventors: Eric Vieil, Meylan; Gérard Bidan, Grenoble; Andrée Gadelle, Montbonnot; Maria-Fatima Mendes-Viegas, Lyon, all of France

[73] Assignee: Commissariat a l'Energie Atomique, Paris, France

[21] Appl. No.: 246,125

[22] Filed: May 19, 1994

[30] Foreign Application Priority Data

Jun. 3, 1993 [FR] France ................................ 93 06655

[51] Int. Cl.$^6$ .................................................. C08L 3/02
[52] U.S. Cl. ............................ 524/48; 525/509; 525/539; 525/540; 252/500
[58] Field of Search ...................... 525/509, 539, 525/540; 524/48; 252/500; 427/58

[56] References Cited

U.S. PATENT DOCUMENTS

| | | | |
|---|---|---|---|
| 3,426,011 | 2/1969 | Parmerter et al. | 536/103 |
| 4,755,326 | 7/1988 | Liepins et al. | 252/518 |
| 5,002,067 | 3/1991 | Berthelsen et al. | 128/786 |
| 5,068,226 | 11/1991 | Weinshenker et al. | 514/58 |

FOREIGN PATENT DOCUMENTS

| | | |
|---|---|---|
| 0060451 | 9/1986 | European Pat. Off. |
| 0315514 | 5/1989 | European Pat. Off. |
| 2622601 | 5/1989 | France . |
| 2586813 | 5/1989 | France . |
| 3607302 | 9/1987 | Germany . |

OTHER PUBLICATIONS

Archives of Biochemistry and Biophysics 105, (1964) "Preparation of 6–Deoxyamylose–6–Sulfonic Acid", Whistler et al., pp. 1–6.

Department of Agricultural and Biological Chemistry, The Pennsylvania State University, University Park, Pa., "The Plant Sulfolipid. VI. Configuration of the Glycerol Moiety", Jan. 5, 1962, Miyano et al., vol. 84, pp. 57–59.

Biochemical Pharmacology, vol. 42, No. 7, pp. 1502–1503, "Sulfation and Hemolytic Activity of Cyclodextrin".

Agnew. Chem. 103, 1991, Nr. 1, Synthese and Charakterisierung von Per(3.6–anyhdro)cyclodextrinen, Ashun et al., pp. 96–97.

Carbohydrate Research, 22 (1972) pp. 23–35, "Zuckersulfonsauren", Lehmann et al.

*Primary Examiner*—Nathan M. Nutter
*Attorney, Agent, or Firm*—Pearne, Gordon, McCoy & Granger

[57] ABSTRACT

Conductive polymer doped by a sulphonated cyclodextrin salt and device for obtaining and/or supplying an active substance incorporating said polymer. The dopant used has the following formula (I):

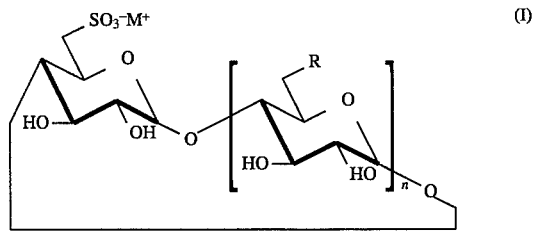

in which n is an integer between 2 and 50, $M^+$ is $Na^+$, $Li^+$, $K^+$ $Mg^+$ ½ or $NH_4^+$ and R represents $-SO_3^-M^+$ or $-OH$, whereby R can differ from one cycle to the other. The doped conductive polymer can be used as an active electrode material in an electrochemical device.

10 Claims, 2 Drawing Sheets

CONDUCTIVE POLYMER DOPED BY A SULPHONATED CYCLODEXTRIN SALT AND DEVICE FOR OBTAINING AND/OR SUPPLYING AN ACTIVE SUBSTANCE INCORPORATING SAID POLYMER

DESCRIPTION

The present invention relates to novel electronically conductive polymers doped by a sulphonated cyclodextrin salt usable in numerous fields in view of their conductive properties. Thus, said polymers can constitute an active electrode material in an electrochemical device. More specifically, these electrochemical devices are intended to collect or obtain and/or salt out an active substance. Thus, the polymers according to the invention can be used in the pharmaceutical, veterinary, chemical and nuclear fields.

As known electricity conducting, organic polymers reference can be made to polyacetylenes, polypyrroles, polyanilines and polythiophenes.

These conductive polymers are generally prepared by a chemical or electrochemical oxidation of the corresponding monomer dissolved in an appropriate solvent containing a simple or complex, doping anion. These anions are in particular the ions $SO_4^{2-}$, $F^-$, $Cl^-$, $BF_4^-$, $PF_6^-$, $ClO_4^-$, $Br^-$ as described in document (1), i.e. FR-A-2 622 601.

It is also known to use cyclodextrins for forming inclusion compounds with numerous organic substances and in particular liquid organic products having a limited solubility in water. In this connection reference can be made to document (2), U.S. Pat. No. 3,426,011; document (3) "Synthese und Charakterisierung von Per(3,6-anhydro)cyclodextrinen" by P. R. Ashton et al, Angew. Chem., 103, no. 1, 1991, pp.96–97; and document (4) "Sulfation and hemolytic activity of cyclodextrin" by E. J. Macarak, Biochemical Pharmacology, vol. 42, no. 7, pp.1502–1503, 1991.

It is also known from document (5), i.e. U.S. Pat. No. 4,755,326 to use cyclodextrin in an electronically conductive polymer doped by an ion of an alkali metal with a view to increasing the electrical conductive of conductive polymers such as polyacetylenes and polypyrones.

It is pointed out that cyclodextrins are cyclic oligosaccharides of D-glucose usually having 6 to 8 D-glucopyranosyl units linked by α-(1→4) linkages, which gives them a toroidal morphology. As a result of this molecular arrangement and the afferent electronic structures, a hydrophobic character is associated with the internal cavity of the cycle, whereas the outer surface of the molecule is hydrophilic.

It is also known that the solubility of cyclodextrins in water and consequently that of their inclusion products are significantly increased when the molecule is substituted by hydrophilic groups. This is in particular the case with cyclodextrins having (aminated or sulphated) charged, polar groups.

In addition, sulphonated derivatives of linear monosaccharides have long been known, in particular from document (6), Carbohydrate Research, 22 (1972), pp.23–35 by J. Lehmann and W. Weekerie, "Zuckersulfonsäuren"; document (7), M. Myano and A. Benson, J. Am. Chem. Soc., 84, 59, 1972, pp.57–62 "The plant sulfolipid. VI. Configuration of the glycerol moiety"; document (8), R. Whistler and D. Mealcalf, Archives of Biochemistry and Biophysics 105, 1964, pp.1–6, "Preparation of 6-deoxyamilose-6-sulfonic acid".

The invention relates to novel electronic conductive polymers doped by a dopant giving a high conductivity to said polymers, as well as active substance collecting properties, permitting their use in devices for collecting and/or salting out active substances and in particular medicaments, in an electrochemical manner.

According to an essential feature of the invention, the novel electronically conductive polymers are doped by a cyclodextrin having at least one sulphonate group.

The dopant according to the invention can have one or more sulphonate groups arranged in symmetrical or non-symmetrical manner on the complete oligosaccharide as a function of the specific application envisaged.

In addition, the polymers according to the invention have a high stability and can be oriented in an electric field.

Advantageously, the dopant of the conductive polymers is of formula (I):

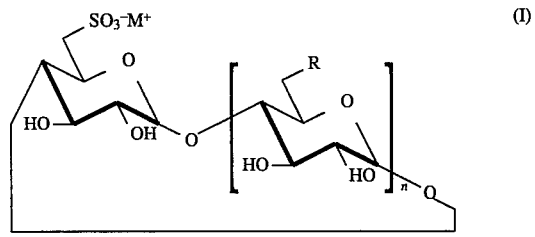

in which n is an integer from 2 to 50, $M^+$ is an ion chosen from among $Na^+$, $Li^+$, $K^+$, $NH_4^+$ and $Mg^+$ ½ and R represents $-SO_3^-M^+$ or $-OH$ and R can differ from one cycle to the next. In particular, n is 2 to 10, preferably 5, 6 or 7.

These sulphonated cyclodextrins can be prepared very simply, unlike certain prior art cyclodextrins (cf. particularly document (2)), by reacting the sulphite of sodium, lithium ($Li_2SO_3$, $H_2O$), potassium ($K_2SO_3$, $2H_2O$), magnesium ($MgSO_3$, $6H_2O$) or ammonium (($NH_4)_2SO_3$ or $NH_4HSO_3$) on a halide of a corresponding cyclomalto-oligosaccharide, in the presence of a phase transfer agent, said halide having at least one halogen atom in the 6-position of a glucose cycle. This leads to the corresponding cyclodextrin salt.

In this process, use is made of direct micellization properties.

The 6-halo derivatives are obtained according to known processes. In addition, the exchange reaction of a halide for a sulphonate has been known for some time in organic chemistry.

The halide can be an iodide, a bromide or a chloride. It can be monohalogenated, partly halogenated or perhalogenated. The position of the halogens in the starting cyclomaltooligosaccharide fixes the position of the sulphonate groups.

Advantageously, the reaction is performed in an aqueous medium, the phase transfer agent ensuring the dissolving of the cyclomalto-oligosaccharide halide, which is normally insoluble in water.

It is pointed out that a transfer agent, also known as a surfactant, is a compound having a polar head and a sufficiently long hydrophobic chain leading to respectively highly marked hydrophilic and lipophilic tendencies. Thus, the dissolving of a small surfactant quantity in a solvent leads to a pronounced reduction in the surface tension. Thus, surfactant solutions are able to incorporate large quantities of compounds normally insoluble in the medium in question.

In order to assist the approach of the sulphite anion solubilized in water to the halo-sulphodextrins, use is preferably made of a surfactant with a polar head positively charged by a quaternary ammonium group. The hydrophobic part has long chain alkyl groups with 4 to 12 carbon atoms.

The counterion of the surfactant can be chosen from among the sulphate, sulphite, iodide, chloride, bromide or acetate anion.

It is also possible to obtain the salts of Li, K, Mg and ammonium of the cyclodextrin by starting with the sodium salt, i.e. a cyclodextrin sulphonate sodium solution by exchange on an ion exchange column in order to replace the $Na^+$ cation by the desired cation.

In the case of the ammonium cation, it is possible to work in the following way. Using an ammonia solution in the form $NH_4^+$, exchange takes place of an acid resin column, e.g. an AMBERLITE 77H$^+$ resin. This is followed by the deposition on the column, which contains 50 times the sodium equivalent to be exchanged, the sodium sulphonate solution, followed by eluting the column with water. The eluate obtained is the ammonium sulphonate of the cyclodextrin.

It is possible to work in the same way with other cations.

The polymers to be doped and which are usable in the invention can be copolymers or homopolymers, which can be prepared in a liquid medium and in particular an aqueous medium. Thus, the polymers according to the invention can be polypyrroles, polyanilines and polythiophenes, which can be prepared by the chemical or electrochemical oxidation of the corresponding monomers in the solvent medium.

The term "polypyrrole", "polyaniline" and "polythiophene" is used to designate homopolymers and copolymers respectively of pyrrole and/or its derivatives, aniline and/or its derivatives such as para(aminodiphenylamine), toluidines, aminophenols and carboxyanilines, thiophene and/or its derivatives such as bithiophene and alkyl-3-thiophenes having 1 to 12 carbon atoms.

Due to the sulphonate groups of the electronic dopant, the cyclodextrins according to the invention have a high solubility in water, which permits the use of this solvent for the production of the polymers according to the invention. However, it is also possible to use other solvents such as acid solutions, e.g. of sulphuric or perchlorate acid, or organic solvents such as acetonitrile or dichloromethane.

As a result of the complexing cavity of the cyclodextrins according to the invention, the doped polymers according to the invention can be used for collecting or obtaining an active substance. The invention also relates to an apparatus for obtaining an active substance having a conductive polymer as defined hereinbefore, constituting an active electrode material and means for controlling the obtaining of said substance by the polymer.

Moreover, as a result of the electronic properties of the conductive polymer (i.e. polythiophenes, polypyrroles, polyanilines, etc.), the doped polymers according to the invention can be used for salting out the previously collected active substance. The invention also relates to an apparatus for supplying an active substance, incorporating a conductive polymer doped in the manner described hereinbefore, constituting an active electrode material and containing said active substance and means for controlling the supply of said substance.

According to the invention, the collecting apparatus and the supply apparatus for an active substance can be the same or different apparatuses.

The electrochemical apparatuses for collecting and supplying the active substance usable in the present invention are those conventionally used in the medical field, in which the existing positive electrode active material is replaced by a polymer film according to the invention. Examples of such apparatuses are described in documents (9) U.S. Pat. No. 5,002,067; (10) EP-A-60 451 and (11) FR-A-2 586 813.

The active substances which can be collected and/or salted out using the apparatus according to the invention are in particular neuroleptics used for the treatment of epilepsy, geriatrics and against tumours, diuretics, antihypertensive agents and antidepressants.

BRIEF DESCRIPTION OF THE DRAWINGS

Other features and advantages of the invention can be gathered from the following non-limitative, illustrative description with reference to the attached drawings, wherein show.

Figure 1:
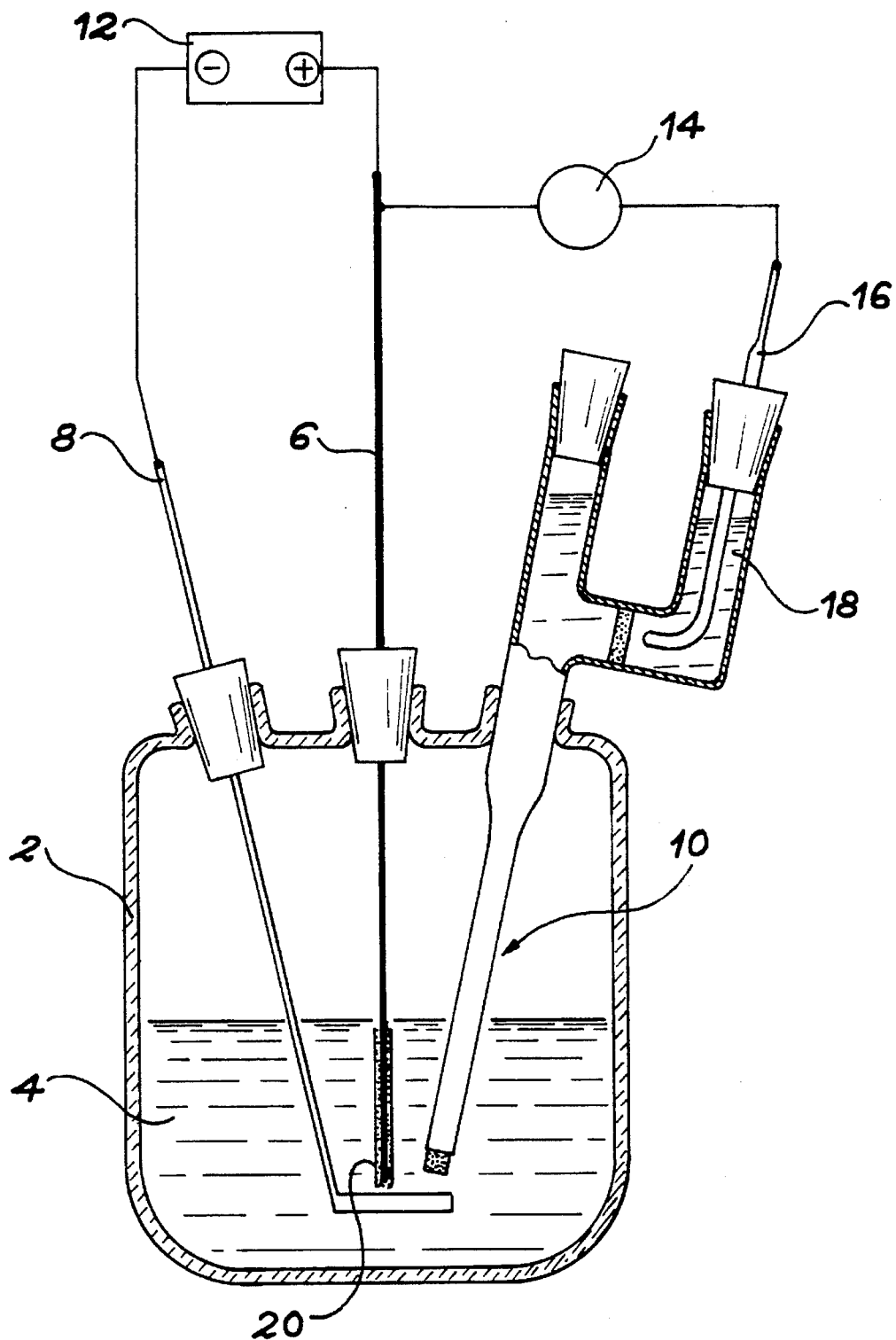
FIG. 1 Diagrammatically an apparatus permitting the production of a conductive polymer according to the invention, as well as its characterization FIG. 2 A cyclic voltametric curve giving the variations of the current density J in mA/cm$^2$ of a polypyrrole film according to the invention doped by a sulphonated β-cyclodextrin, in the presence of an aqueous lithium perchlorate solution, as a function of the voltage U in volts applied to said film and measured relative to the reference silver electrode.

In exemplified manner, a description will now be given of the production of a polypyrrole film doped by the heptakis-(6-deoxy-6-sulphonyl)-cyciomaltoheptose sodium salt by electrochemical pyrrole oxidation in the presence of said salt.

For this purpose into a tight, insulating container 2 is introduced a bidistilled aqueous solution 4 of said cyclodextrin salt, at a rate of 0.01 mole/dm$^3$ and pyrrole at a rate of 0.1 mole/dm$^3$. When the monomer and cyclodextrin have been dissolved, degassing takes place with using nitrogen for 10 minutes.

Into the electrolyte 4 is then introduced a platinum working electrode 6 serving as the anode, an auxiliary electrode 8 serving as the cathode and a silver reference electrode 10. The electrodes 6 and 8 are connected outside the container 2 respectively to the positive pole and the negative pole of a power supply 12.

In order to measure the potential difference between the reference electrode 10 and the working electrode 6, a voltmeter 14 is connected between these electrodes 6 and 10. The current or current density flowing between the electrodes 6 and 8 is measured with the aid of an ammeter connected in series (not shown) or read directly on the power supply 12.

In known manner, the reference electrode 10 has a silver wire 16 immersed in a solution 18 of LiClO$_4$ and AgNO$_3$ with an Ag$^+$ ion concentration of $10^{-2}$M.

With the aid of the power supply 12, a constant potential of 0.4 relative to the reference electrode 10 is applied. The maximum synthesis charge is 0.7C/cm$^2$. Above said maximum charge, the doped polypyrrole film 20 obtained no longer adheres to the surface of the electrode 6.

The electrode 6 covered with the doped film is then rinsed with the electrolytic solution used either for the electrochemical characterization of the film, or for the electrochemical collecting of an active substance. This electrolytic solution is in particular lithium perchlorate dissolved in water at a rate of 0.5 mole/dm$^3$.

The characterization of the film by cyclic voltammetry is carried out with the aid of an apparatus identical to that of FIG. 1 in which the solution of sulphonated cyclodextrin salt and pyrrole is replaced by the lithium perchlorate solution. After dissolving the lithium perchlorate in water, the solution obtained is alegassed with nitrogen for 10 minutes.

Figure 2:
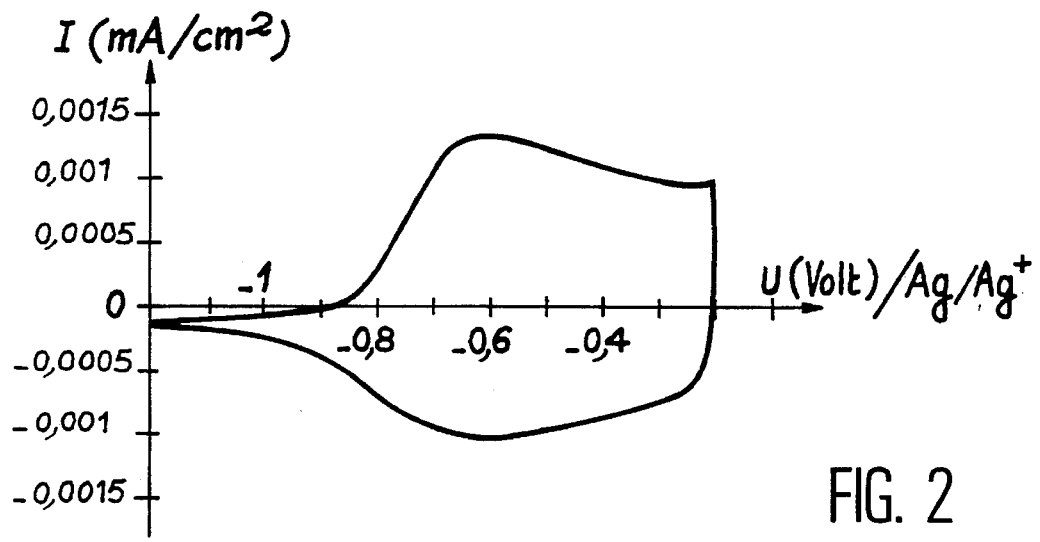

By performing a potential sweep between −1.2 and −0.2 volts at a speed of 50 mV/s, for the doped polypyrrole prepared in the aforementioned manner, the curve shown in FIG. 2 was obtained.

This curve clearly indicates that the sulphonated β-cyclodextrin gives the polypyrrole film conductive properties. The polypyrrole film had a thickness of $\frac{1}{10}$ mm corresponding to a synthesis charge of $0.7C/cm^2$.

The electrode 6, covered with the doped polypyrrole film 20, following its characterization, can then be used for collecting or obtaining a neutral molecule which is insoluble in water, namely N-methyl phenothiazine (NMP) of formula (11):

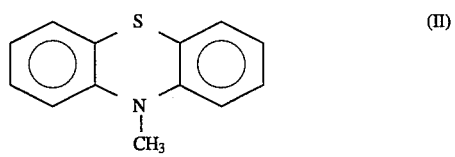

(II)

This species belongs to a family of molecules, the phenothiazines, which have important applications in the pharmacological field.

For this purpose, the electrode 6 provided with the polypyrrole film 20 is reduced in the lithium perchlorate characterization solution, by applying a voltage of −1.2 V with the aid of the power supply 12, measured relative to the reference electrode. This voltage is maintained until no further reduction current of the doped polypyrrole film if measured.

The electrode 6 with the film 20 in the reduced state is then transferred into a solution having a known concentration of the species to be collected, in this case NMP, at a rate of 0.1 mole/$dm^3$ dissolved in acetonitrile, for a given time of in this case 90 minutes, accompanied by stirring and under an inert argon or nitrogen atmosphere. The electrode is then left at this potential, i.e. no potential is applied to it.

Following the collecting of the chemical species by the doped polypyrrole film, said film is rinsed in a solution in which the collected species is insoluble or only very slightly soluble and having a high ionic force in order to prevent the decomplexing of the collected species by the sulphonated β-cyclodextrin salt.

For NMP, use is made of aqueous lithium perchlorate solutions with a concentration of 0.5 mole/$dm^3$.

The function of this rinsing solution is to remove the species adsorbed on the surface of the film on the electrode. Rinsing is performed for a given time of approximately 45 minutes, accompanied by stirring and in an inert atmosphere in the present case.

Figure 3:
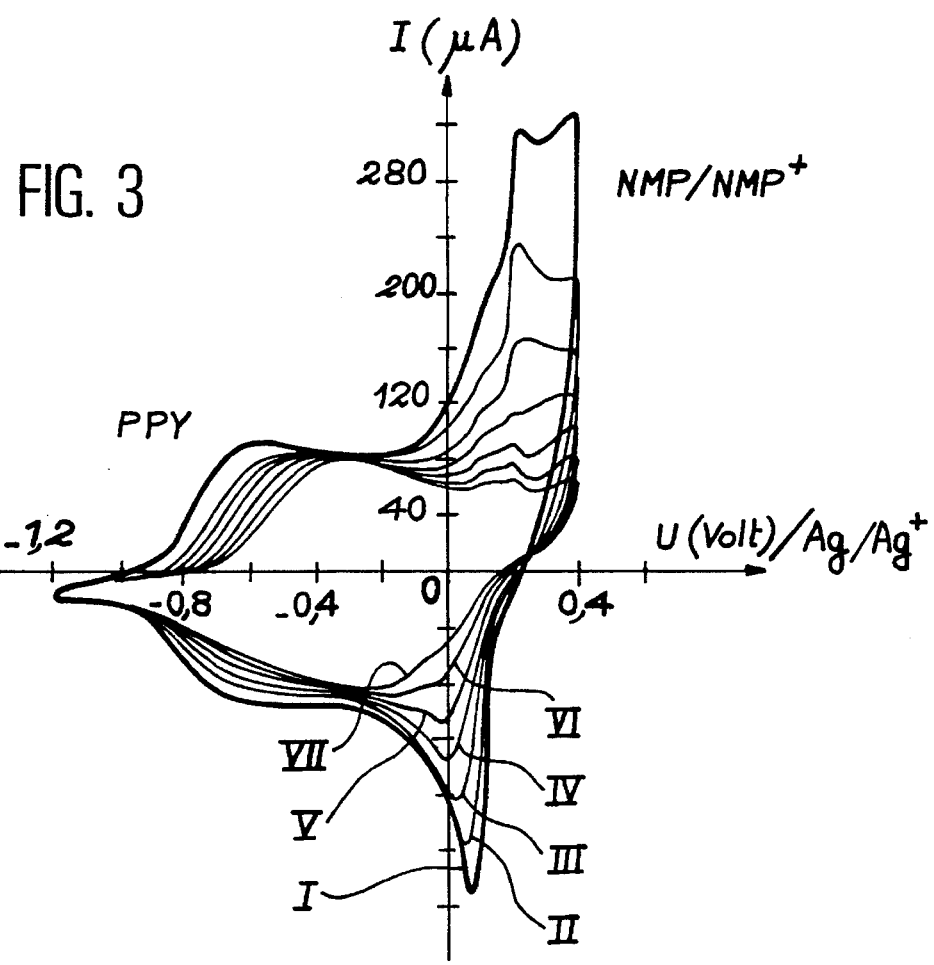
FIG. 3 The evolution of the redox behaviour during a cycling of a polypyrrole film doped by a sulphonated β-cyclodextrin in an aqueous lithium perchlorate solution, following the collecting of N-methyl phenothiazine (NMP), curves I to VII giving for 7 cycles the variations of the current I in μA as a function of the voltage U in volts applied to the polypyrrole film and measured relative to the silver electrode.

The electrochemical characterization of the doped polypyrrole film which has collected the NMP was performed by cyclic voltammetry using the apparatus of FIG. 1. FIG. 3 corresponds to said voltammetry characterization.

Curves I to VII of FIG. 3 were plotted during 7 cycles at a potential sweep rate of 20 mV/s in a 0.5 mole/l aqueous lithium perchlorate solution. These curves 3 in particular reveal the NMP salting out process to the electrolytic solution during cycling. In these curves, PPy designates the doped polypyrrole.

The production of the doped polypyrrole film 20 as the active electrode material 6 for obtaining and/or salting out an active substance described hereinbefore started with an aqueous sulphonated β-cyclodextrin solution.

The following examples describe the production of a few sulphonated derivatives usable in the invention.

PRELIMINARY EXAMPLE

Preparation of the phase transfer solution.

44.2 g (i.e. 0.1 mole/l) of methyl trioctyl ammonium chloride were dissolved in 500 ml of water and treated by 60 g of basic resin of type Dowex® SBR OH⁻ for 0.25 h. The resin was then removed by filtration and carefully rinsed with distilled water. The combined filtrates are neutralized by a 2N sulphuric acid solution. This neutralization is followed by potentiometry. The emulsion volume obtained is topped up to 1.5 liters and its pH adjusted to 6.5 by adding a 1N soda solution. This stable surfactant emulsion is used directly in the operating procedures described hereinafter of preparing the sulphonated cyclomalto-oligosaccharide sodium salt.

EXAMPLE 1

Synthesis of heptakis-(6-deoxy-6-Sulphonyl)-cyclomalto-heptaose sodium salt.

To 120 ml of the aforementioned surfactant are added 900 mg (7.14 mmole) of sodium sulphite and 900 mg (3.31 mequiv.) of heptakis-(6-deoxy-6-iodo)-cyclomalto-heptaose prepared according to the operating procedure described by A. Gadele and J. Deraye in document (9) Angew. Chem. Int. Ed. Engl., 30, pp.78– 80, 1991, "Selective halogenation at primary positions of cyclomalto-oligosaccharides and a synthesis of per-3,6-anhydro-cyclomalto-oligosaccharides".

The mixture was heated to 100° C. for 24 h. After cooling, the reaction mixture is extracted by dichloromethane in two passages of 100 ml each. The organic fraction is brought to dryness (i.e. 4.2 g) and, apart from the surfactant, it contains heptakis-(6-deoxy-6-sulphonyl)-cyclomalto-heptaose.

To this organic residue are added 1 ml of DMSO and an organic mixture containing 250 ml of methanol, 150 ml of acetone and 1 ml of aqueous 4N soda solution. The cloudy solution obtained is then centrifuged at 5000 r.p.m. for 20 min. The sediments recovered are dissolved in distilled water and the filtered solution is lyophilized.

A NMR spectrum of $^{13}C$ reveals the presence of the heptakis-(6-deoxy-6-sulphonyl)-cyclomalto-heptaose sodium salt, whereof 700 mg are obtained, which corresponds to an 85% yield, based on the starting halide.

EXAMPLE 2

Synthesis of the heptakis-(6-deoxy-6-sulphonyl)-cyclomalto-hexaose, sodium salt.

To 120 ml of the aforementioned surfactant emulsion are added 900 mg (7.14 mmole) of sodium sulphite and 900 mg (3.31 mequiv.) of heptakis-(6-deoxy-6-iodo)-cyclomalto-hexaose prepared as in document (8). The mixture is heated to 100° C. during 24 h. After cooling, the reaction mixture is extracted by dichloromethane in two passages of 100 ml each. The organic fraction is brought to dryness (i.e. 4.2 g) and, apart from the surfactant, it contains heptakis-(6-deoxy-6-sulphonyl)-cyclomalto-hexaose.

The organic residue obtained is then treated as in example 1.

A NMR spectrum of $^{13}C$ reveals the presence of the heptakis-(6-deoxy-6-sulphonyl)-cyclomalto-hexaose sodium salt in a quantity of 653 mg, which corresponds to a yield of 80%, based on the starting halide.

EXAMPLE 3

Synthesis of the heptakis-(6-sulphonyl)-cyclomalto-heptaose sodium salt.

The 900 mg of heptakis-(6-deoxy-6-iodo)-cyclomaltoheptaose of example 3 are replaced by 750 mg of heptakis-(6-bromo-6-deoxy)-cyclomaltoheptaose.

The product obtained has the same physical characteristics as that obtained from the corresponding iodine derivative of example 1.

We claim:

1. Electrically conductive polymer doped by a dopant, characterized in that the dopant is a cyclodextrin having at least one sulphonate group.

2. Polymer according to claim 1, characterized in that the dopant has the following formula (I):

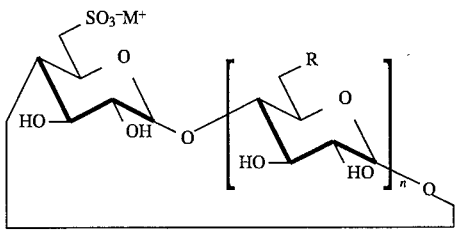

in which n is an integer from 2 to 50, $M^+$ is an ion chosen from among $Na^+$, $Li^+$, $K^+$, $NH_4^+$ and $Mg\ ½^+$ and R represents $—SO_3^-M^+$ or $—OH$ and in which R can differ from one cycle to the next.

3. Polymer according to claim 2, characterized in that $M^+$ is $Na^+$.

4. Polymer according to claim 2, characterized in that n is 2 to 10.

5. Polymer according to claim 2, characterized in that n is 5, 6 or 7.

6. Polymer according to claim 2, characterized in that $R=—SO_3^-Na^+$ for all the cycles and n is 5 or 6.

7. Polymer according to either of the claims 1 and 2, characterized in that the polymer is a homopolymer or copolymer of a monomer chosen from among pyrrole, thiophene, bithiophene, aniline, para(aminodiphenylamine) and their derivatives.

8. Polymer according to claim 7 characterized in that the polymer is a polypyrrole.

9. Polymer according to claim 7 characterized in that it is obtained by the electrochemical oxidation of a monomer polymerizable in a liquid medium containing cyclodextrin.

10. Polymer according to claim 7 characterized in that the dopant contains an active substance.

* * * * *